2,977,219
PROCESS FOR PURIFYING TITANIUM

Edward J. Chapin, Washington, D.C., assignor to the United States of America as represented by the Secretary of the Navy No Drawing. Filed Sept. 30, 1957, Ser. No. 687,303
3 Claims. (Cl. 75—84)
(Granted under Title 35, U.S. Code (1952), sec. 266)

The invention described herein may be manufactured and used by or for the Government of the United States of America for governmental purposes without the payment of any royalties thereon or therefor.

This invention relates to the purification of titanium, more particularly to a process for removing oxygen from solution in the metal.

Titanium is a reactive metal having a very high affinity for oxygen at elevated temperatures and capable of absorbing oxygen in large amounts up to approximately 14 weight-percent in solid solution. It is susceptible to contamination by absorption of oxygen in all stages of processing. The presence of oxygen in solution in titanium is known to strongly affect the mechanical properties of the metal. Relatively small quantities of oxygen in solution markedly lower the tensile and notch ductility of the metal.

It has been heretofore proposed to employ reducing agents for removing oxygen from solution in titanium but up to the present a process of this kind has not been known which is effective to lower the dissolved oxygen content of the metal to a level at which the embrittling effect of this oxygen has been removed.

The degree of separation of oxygen from solid solution in titanium depends upon the ability of the reducing agent to overcome the increasing affinity of titanium for oxygen as the concentration of the dissolved oxygen becomes more dilute. This is indicated by the sharp increase in the partial free energy of dissociation with decreasing oxygen content. For each reducing agent there will be a certain equilibrium concentration of oxygen below which no further reduction will occur under the given conditions, and the oxygen content may be decreased only to the point where the oxygen pressure of the solution equals the pressure of the most stable oxygen compound of the reducing agent. The absence of suitable thermochemical data prevents a prediction as to which reducing agent is required and the extent to which a possible reducing agent may remove oxygen from solution in the metal.

It is an object of the present invention to provide a reducing type of process for removing oxygen from solution in titanium which is effective to lower the dissolved oxygen content of titanium to a level at which the ductility of the metal is restored. It is a further object to provide a process of this kind which can be employed for obtaining titanium having a predetermined low content of dissolved oxygen.

The above and other objects can be accomplished by the process of my invention which comprises forming a melt of the oxygen-containing titanium with thorium or gadolinium as the reducing metal under an inert atmosphere. The reducing metal is employed in stoichiometric or reacting equivalent amount for the dissolved oxygen in the titanium. An excess of the reducing metal may also be used, although it does not appear to be compensated for by a greater removal of dissolved oxygen from the titanium. For best results the thorium and gadolinium are employed in a pure state, particularly free from oxygen. While the process can be practiced to remove the larger amounts of oxygen from solution in the metal, it is preferably applied to the purification of titanium in which the dissolved oxygen content is about 1 weight-percent and less.

The process can be carried out by melting the mixture of the titanium and the calculated quantity of the metal reducing agent in an arc furnace of the type described by Kroll in Transactions of the Electromechanical Society 78, 43 (1940), using a non-consumable tungsten cathode or a consumable electrode of titanium with which the reducing metal has been incorporated and a water-cooled copper crucible as anode. The melting is done in an inert atmosphere for which there can be used the rare gases, helium, argon, neon, etc., in a pure dry condition.

The process of my invention is illustrated by the following specific examples in which a series of additions of the reducing metal were made to melts of titanium containing 1 weight-percent of oxygen and in reference melts of iodide-quality titanium (a pure product).

The titanium-1 weight-percent oxygen alloy was prepared by fusing iodide-quality titanium with the required amount of spectroscopically pure titanium dioxide ($TiO_2$) into 500 gram ingots. The ingots were hot-worked into 1 inch diameter bars and further reduced to approximately 0.8 inch diameter by machining to remove surface contamination.

The amount of oxygen removed from solution in the titanium by treatment with the reducing metal was determined by reference to the hardness of the treated metal and by chemical and X-ray diffraction analysis. The presence of oxygen in solution in titanium induces hardness in the metal and progressively with increasing concentration. The hardness increases from approximately 75 DPH (Vickers) for pure titanium to approximately 160 DPH for 0.1 weight-percent oxygen and to 395 DPH for 1 weight-percent oxygen content.

EXAMPLE 1

A series of charges made up of 15 grams of the 1% dissolved oxygen-containing titanium prepared as above and of respectively 3.5, 4.6, 6.8, 9.1, 12.1 and 17.9 weight-percent of high purity thorium were melted in an arc furnace as described above to a fluid melt. The melting was done in a pure dry helium atmosphere, using a non-consumable tungsten cathode and a water-cooled copper crucible as anode. The melts were solidified in the copper crucible under the inert atmosphere.

Reference melts prepared in the same way, using iodide-quality titanium and equivalent amounts of the pure thorium, were used for ascertaining the effects of the thorium upon the hardness and microstructure of pure titanium. Casting of the reference melts was made as above.

The additions of the high purity thorium to the titanium-oxygen alloy melts resulted in a progressive decrease in hardness of the as-cast metal as shown in the table below.

Table 1

| Thorium, Weight Percent Addition | Hardness, DPH | Residual Dissolved Oxygen in Metal, Weight Percent |
|---|---|---|
| none | 395 | 1.0 |
| 3.1 | 349 | 0.78 |
| 4.6 | 324 | 0.59 |
| 6.8 | 259 | 0.29 |
| 9.1 | 223 | 0.18 |
| 12.1 | 214 | 0.18 |
| 17.9 | 226 | 0.21 |

No appreciable decrease in the as-cast hardness of the titanium occurred beyond 9.1 wt. percent thorium, indicating that the limit of deoxidation for the particular titanium-oxygen alloy treated was reached at a thorium content estimated at approximately 8.4-wt. percent. The residual oxygen remaining in solution in the titanium was determined to be 0.18 wt. percent from the amount of acid insoluble residues recovered from the samples treated with the 8.4 wt. percent addition. This residual oxygen content represents an 82 weight-percent removal of oxygen from solution in titanium.

The reference addition of thorium to the iodide-quality titanium resulted in a progressive hardening of the titanium reaching a maximum of 209 DPH at 9.1 wt.-percent thorium. Somewhat lower hardnesses resulted from the addition of 12.1 and 17.9 wt.-percent thorium. This apparent softening effect may be due to the increased amount of free thorium present in the microstructure. The fact that a maximum hardness is reached indicates that thorium has limited solubility in alpha titanium. The hardness values of the as-cast reference metal in the ascending order of magnitude of thorium addition were 190, 197, 200, 205, 183 and 180.

The microstructure of the as-cast, untreated homogeneous titanium-1 weight-percent oxygen alloy treated in the above example shows that it is a single phase structure and that all of the oxygen is in solid solution. The microstructure of this alloy, deoxidized with the various additions of thorium and as-cast, showed that a second phase outlined solidification grain boundaries up to 6.8 wt.-percent thorium. Above this amount of thorium, the second phase generally occurred in larger aggregates. The deoxidation product which occurred as a second phase in the microstructure was isolated chemically and identified as thorium dioxide by X-ray diffraction. Free thorium was also detected in the metal deoxidized with both the 9.1 wt.-percent thorium addition and with the higher amounts thereof. With the 12.1 wt.-percent addition, another phase was detected which was similar to that observed in the reference alloys from the treatment of the iodide-quality titanium with thorium and which probably is a thorium-titanium compound.

EXAMPLE 2

In the manner of Example 1, a similar series of charges of both the titanium-1 weight-percent oxygen alloy and the iodide-quality titanium using a pure gadolinium as the reducing agent in place of the thorium were prepared, arc-melted and cast. The charges were prepared with amounts of the gadolinium as follows: 3.2, 6.2, 11.5 and 16.4 weight-percent, respectively.

The additions of the pure gadolinium to titanium-oxygen alloy melts progressively reduced the hardness of the as-cast metal from the initial 395 DPH for the untreated titanium alloy to a low of 174 DPH for a 9.2 weight-percent addition. Additions greater than the 9.2 weight-percent gadolinium did not significantly reduce the hardness beyond the limit reached with this amount. The limit of oxygen removal from solution in titanium by gadolinium appears to be approximately at 7.5 weight-percent pure gadolinium. The results obtained with addition of gadolinium to the molten titanium-oxygen alloy appear in the table below.

Table 2

| Gadolinium, Weight-Percent Addition | Hardness, DPH | Residual Dissolved Oxygen in Metal, Weight-Percent |
| --- | --- | --- |
| none | 395 | 1.0 |
| 3.2 | 270 | 0.50 |
| 6.2 | 186 | 0.16 |
| 9.2 | 174 | 0.13 |
| 11.5 | 170 | 0.12 |
| 16.4 | 170 | 0.12 |

The gadolinium added to the iodide-quality titanium in the above tests hardened the metal to a maximum of 139 DPH for a 6.2 weight-percent addition. The same amount added to the titanium-oxygen alloy reduced the hardness of that metal from 395 DPH to 186 DPH. In the case of the 9.2 weight-percent gadolinium addition, hardness difference may be used to estimate the residual dissolved oxygen content in the titanium-oxygen alloy. This value is equivalent to about 0.1 weight-percent oxygen, indicating removal of approximately 90% of the oxygen from solution in the titanium-oxygen alloy.

The products of deoxidation could not be isolated from the treated titanium-oxygen alloys by normal chemical treatment. Metallographic examination showed that for gadolinium added to iodide titanium, a second phase outlined solidification grain boundaries, whereas in the case of the gadolinium additions to the titanium-oxygen alloy, the product of deoxidation was precipitated in the melt before solidification and appear as long straight stringers traversing metal grains. X-ray diffraction analysis revealed that free gadolinium and a phase representing a high temperature form of gadolinium sesquioxide were present in the deoxidation products.

Heat treatment of the deoxidized titanium showed similar behavior in respect to modification of the hardness for both the thorium and the gadolinium treated metal on the basis of the amount of the reducing metal added to the titanium-oxygen alloy.

Since the invention herein described may be variously embodied without departing from the spirit or scope thereof, it is to be understood that specific embodiments appearing in the above description are to be taken as illustrative and not in limitation except as may be required by the appended claims.

What is claimed is:

1. A process for removing oxygen from solution in titanium containing the same in amount up to about 1% by weight which comprises forming a melt of the titanium under an inert atmosphere with an amount of thorium substantially the chemical equivalent for the dissolved oxygen in the titanium and solidifying the melt under an inert atmosphere.

2. A process for removing oxygen from solution in titanium containing the same in amount up to about 1% by weight which comprises forming a melt of the titanium under an inert atmosphere with an amount of gadolinium substantially the chemical equivalent for the dissolved oxygen in the titanium and solidifying the melt under an inert atmosphere.

3. A process for removing oxygen from solution in titanium containing the same in amount up to about 1% by weight which comprises forming a melt of the titanium under an inert atmosphere with an amount of a metal selected from the group consisting of thorium and gadolinium which is substantially the chemical equivalent for the dissolved oxygen in the titanium and solidifying the melt under an inert atmosphere.

References Cited in the file of this patent

UNITED STATES PATENTS 2,773,787    Rick    Dec. 11, 1956

OTHER REFERENCES

Hampel: Rare Metals Handbook (1954), pp. 340, 344.
Hampel: "Rare Metals Handbook" (1954), pp. 449.